Fig. 1

INVENTOR
Frederick P. Gorin

INVENTOR
Frederick P. Gorin

INVENTOR
Frederick P. Gorin

Patented June 20, 1933

1,915,246

UNITED STATES PATENT OFFICE

FREDERICK P. GORIN, OF SEATTLE, WASHINGTON, ASSIGNOR TO GORIN SHOCK-LESSPEED TABULATOR COMPANY, A CORPORATION OF WASHINGTON

TABULATING MECHANISM FOR TYPEWRITERS

Application filed February 25, 1930. Serial No. 431,078.

This invention relates to improvements in tabulating mechanisms. The principal object of the invention is to provide a carriage rebound preventing trap with means for setting the trap prior to the collision of the tabulator stops at the printing point during a tabulating operation, and means independent of the movement of the carriage for automatically unsetting the trap when the carriage has reached the printing point. An important feature of the invention is that automatic instrumentalities are also provided which cause the setting of the rebound preventing trap coincidentally with the operation of a tabulator key, which also prevents the unsetting of the trap until the carriage comes to rest at the printing point, which renders it unnecessary for the operator to continue pressure upon the tabulator key after it has once been depressed in the usual manner. Another important feature is to combine a carriage buffer.

For a clear understanding of terms used throughout the specification and claims, I desire it to be understood that by the expression "writing point", or "printing point", I mean a point anywhere between the particular marking on the usual typewriter scale at which the carriage finally stops after it has reconnected with the letter feeding mechanism,—and the next mark on the scale to the left of that point. This is so because after the carriage has been arrested by the tabulator stops it always moves to the right, or in letter feed direction, a fraction of a letter space, usually about one-half of a letter space or a little more, after the tabulator plunger has been withdrawn from the path of the tabulator stop on the stop rod.

When I use the expression "tabulator run" of the carriage, I mean the distance from the starting point of the carriage, or when the tabulator key is depressed, up to the time when the carriage comes to rest at the writing point, as just defined. If no carriage buffer be employed, then the tabulating run of the carriage would of course be the exact distance from its starting point to the writing point, but if a carriage buffer be employed, then the tabulating run would be the distance from the starting point to the writing point plus the continued run of the carriage past the writing point against the carriage buffer and the return movement of the carrige to the writing point under the reflex action of the buffer spring. Therefore the actual distance covered by the carriage would be greater when a carriage buffer is employed than when it is not employed, but in either case the carriage would have to come to at least momentary rest at the writing point before the carriage could be released from the control of the rebound preventing trap.

The term "rebound" means any movement of the carriage in contra letter feed direction from the printing point after the carriage has reached that point in a tabulating operation.

While in the following illustration of my invention it happens that the setting of the rebound trap, at the same time, causes the locking out of the tabulating mechanism, yet such locking out can only occur when the operator fails to hold the tabulator key down after it is once pressed, but in either case the reconnection of the carriage with the letter feeding mechanism at exactly the predetermined writing point is insured, because no reconnection can occur until the carriage has come to complete momentary rest at the printing point and this is true whether a buffer be employed or not.

It is not new to equip a tabulating device with means which automatically locks the tabulator in operated position after the tabulator key has been depressed, leaving the carriage free to rebound away from the printing point after it has reached that point and to continue to so rebound or oscillate back and forth until the lock be released, but it is not enough to merely do this because experience has shown that so long as there is any rebound at all there is always danger that the carriage will not reconnect with the letter feed mechanism exactly at the writing point after the release of the lock. Therefore, it is one of the purposes of this invention to not only trap but to prevent the rebound, and to prevent any lateral movement or oscillation of the carriage whatever within the trap while it is being held by the trap at the printing point.

In many devices heretofore known in the art, which merely lock out the tabulating mechanism, such as just described,—the tabulator lock out mechanism is, in some cases, automatically unlocked after the carriage has reached the printing point, as by providing a series of teeth on the tabulator plunger, and a corresponding series of notches on the typewriter frame, adapted to engage each other so as to hold the tabulator plunger extended into the path of the stops on the tabulator stop bar, whereby the first impact of the tabulator stop with the extended plunger springs the plunger sidewise sufficiently to disengage its tooth from the first notch, allowing the plunger to spring back and its tooth to be engaged with the next notch and so on, the carriage meanwhile freely rebounding any distance; the extended tabulating plunger in other words, being released notch by notch according to the number of rebounds that the carriage happens to take. The operation of such a device is uncertain because of these repeated rebounds and the uncertainty of the tabulator plunger to be finally completely released.

In some other cases the tabulator plunger is locked out when a tabulator key is depressed and the lock out mechanism remains securely locked, but nevertheless leaving the carriage free to rebound, exactly as in the case just described. In such a device the lock is unlocked by a depression of one of the usual type keys or the space bar. Similar disadvantages exist in this type of device as in the first case just described, because a type key or space bar may be struck before the carriage has ceased to oscillate or rebound, and besides this an outstanding difficulty is that the operation of the type key or space bar has the added friction or resistance upon it due to the unlocking of the lock, thus rendering the operation of the type keys or space bar variable; it being remembered that uniformity of the touch of the type keys and the space bar in all typewriting machines is a great disideratum; it being one of the controlling features of all typewriting machines.

Figure 1:
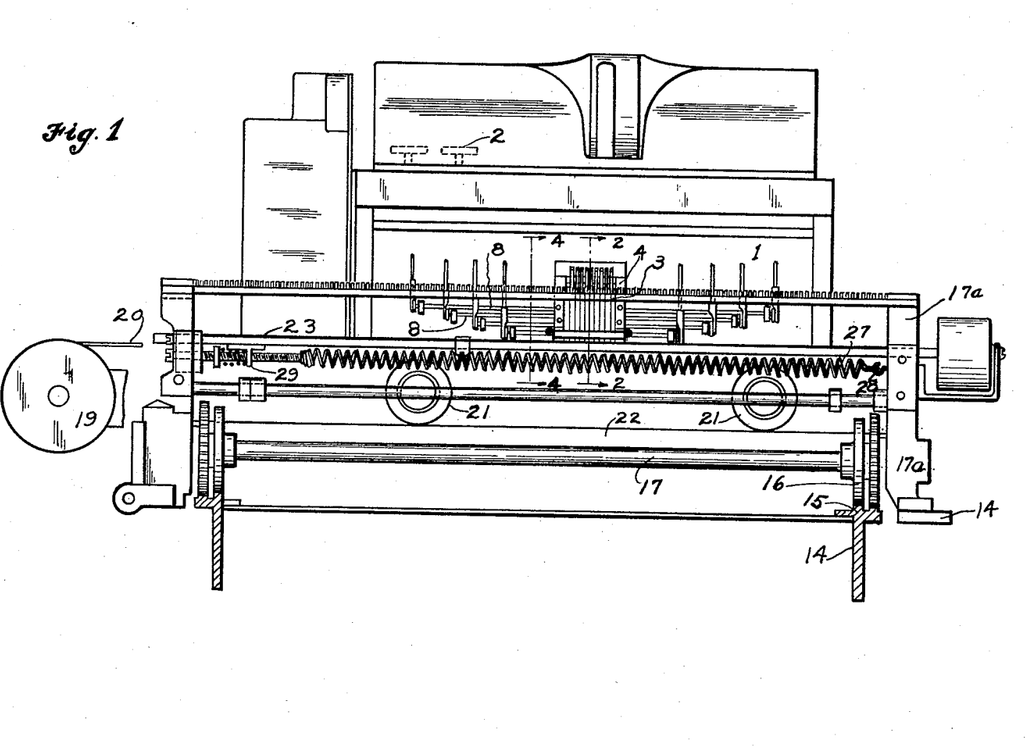
Fig. 1 is a rear elevation view of the well known Elliott Fisher flat bed typewriting machine with my device applied thereto.
Figure 2:
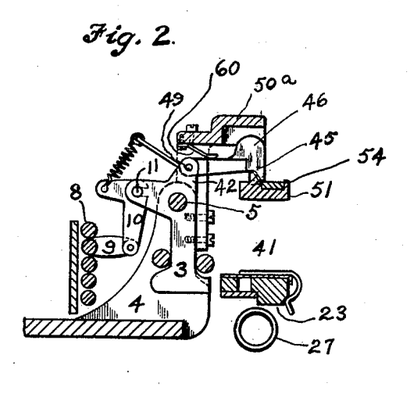
Fig. 2 is a sectional view upon the line 2—2 of Fig. 1, with the parts in their normal positions.
Figure 3:
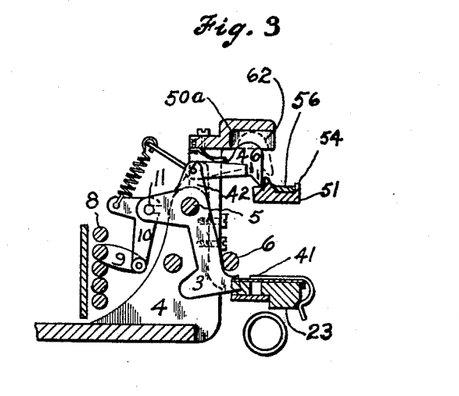
Fig. 3 is a similar view with the parts in operative position.
Figure 4:
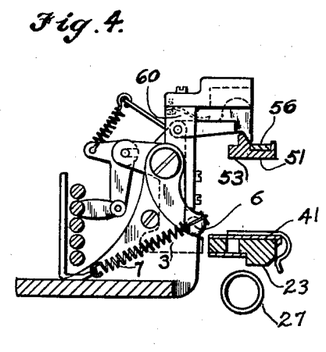
Fig. 4 is a similar view taken upon the line 4—4 of Fig. 1 with the parts in their normal positions.
Figure 5:
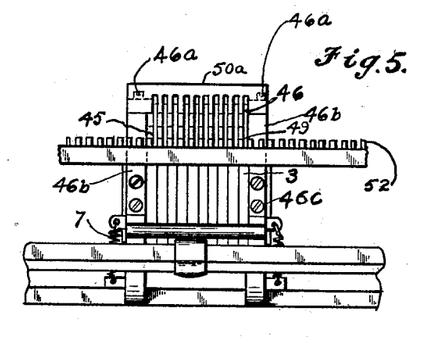
Fig. 5 is an enlarged fragmentary view of the plunger box and plungers and closely related parts.
Figure 6:
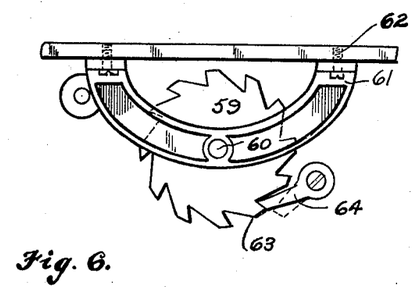
Fig. 6 is an enlarged detail view showing the carriage feed wheel and pawl.
Figures 7, 8:
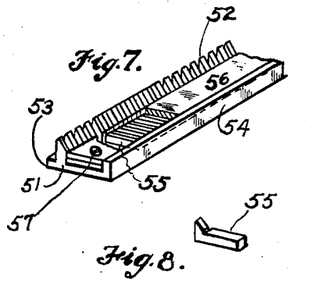
Fig. 7 is a perspective view of the trap rack.
Fig. 8 is a similar view of one of the plugs for the teeth of the trap rack.
Figure 9:
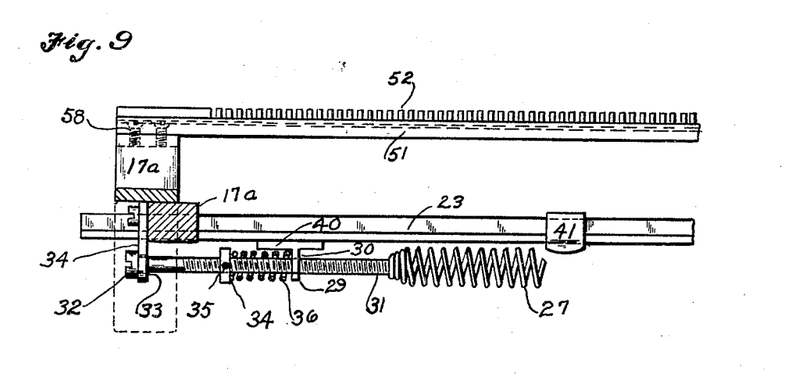
Fig. 9 is a rear elevation of a portion of one end of the trap rack and its manner of mounting upon the printing carriage, together with the buffer cushion.
Figure 10:
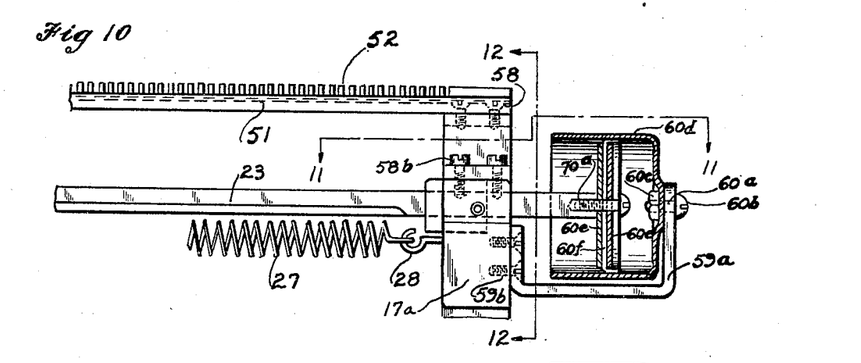
Fig. 10 is a similar view partly in section of the opposite end of the same parts.
Figures 11, 12:
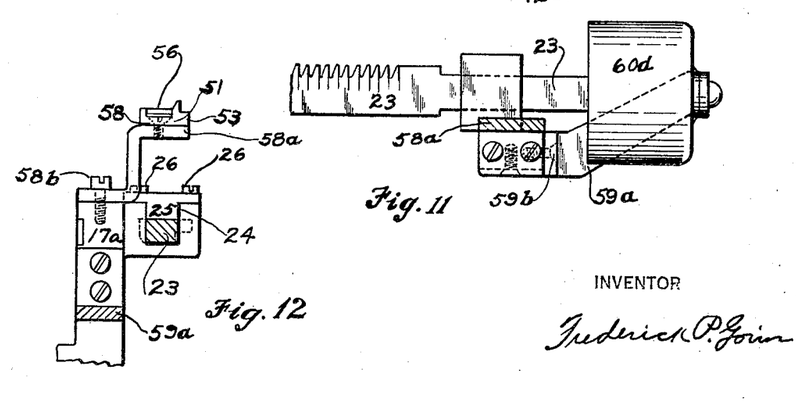
Fig. 11 is a cross sectional view taken upon the line 11—11 of Fig. 10.
Fig. 12 is a similar view taken upon the line 12—12 of Fig. 10.
Figure 13:
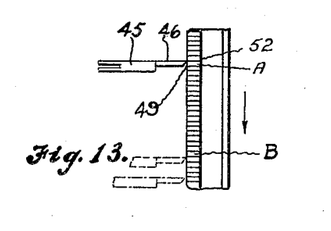
Fig. 13 is a fragmentary view showing the different positions of the trigger with respect to the trap rack at about the time of the collision of the tabulator stops.
Figure 14:
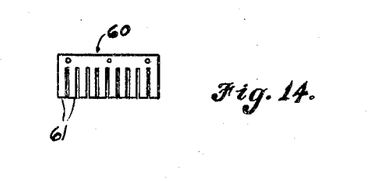
Fig. 14 is a similar view of the controlling springs for the triggers.
Figure 17:
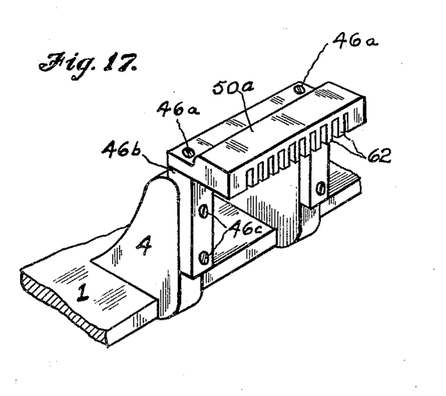
Fig. 17 is a similar view of the comb and plunger box, with the parts broken away.
Figure 18:
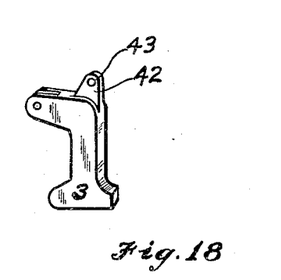
Fig. 18 is a similar view of one of the plungers.

Referring now more particularly to the drawings, reference numeral 1 indicates the printing carriage; 2 the usual tabulator keys, 3 the tabulator plungers mounted within the plunger box 4, and pivotally connected thereto at 5, having the usual universal bar 6, which holds all of the plungers in their normal positions as seen in Figs. 2 and 4. 8 indicates rock shafts connected by members 9 to bell cranks 10 which are connected at 11 to the plungers so that upon the operation of one of the tabulator keys 2, a corresponding plunger 3 moves into its operative position as seen in Fig. 3. 14 is the frame work or bed of the machine. 15 indicates tracks upon which run wheels 16. 17 is a cross rod revolubly mounted with respect to the movable frame 17—a, and to which the wheels 16 are fixed. 19 is the usual motor drum, connected to the printing carriages by the usual tape 20. 21 indicates wheels mounted upon the printing carriage and which run upon tracks 22 upon movable frame 17—a. 23 is the usual tabulator stop bar which instead of being rigidly mounted upon the movable frame 17—a, is slidably mounted thereon. This is accomplished by milling channels 24 in the movable frame, (Fig. 12), into which the stop bar is placed, and inserting caps 25 into the channels and screwing the caps firmly to the movable frame 17—a, as by screws 26. A buffer spring 27 has one of its ends engaged by a hook 28, which projects from one side of the movable frame 17—a and the opposite end of the spring is attached to a threaded stem 31, (Figs. 1 and 9) which passes freely through a smoothly bored hole 30 in a bracket 29, rigid with the stop bar 23. The outer end of the stem is provided with a head 32 of larger diameter than an aperture 33 through a plate 34, secured to the movable frame 17—a. Upon the threaded stem is mounted a nut 34 which is preferably provided with holes 35, so that by inserting a wire or the like into the holes the nut may be moved along the stem in either direction by means of the threads. A relatively light spring 36 is interposed between the nut 34 and the bracket 29. The bracket is bent over as at 40 so that a movement of the stop bar 23 towards the left, (Fig. 9), will cause the spring 36 to cushion the movement until the bent over portion 40 of the bracket contacts with the nut 34, and if the movement of the bar is then continued, the threaded stem 31 will be picked up and the stem moved against the action of the main buffer spring 27. By this arrangement the light spring 26 will cushion a slight movement of the stop bar, and will be prevented from setting by the extension 40, which limits the compression of the spring 36. This arrangement is substantially the same as I show and describe in my copending application Serial No. 299,082, filed August 11, 1928. Since a very short run of the printing carriage during the tabulating operation results in a correspondingly slight impact or shock, the spring 36, extension 40 and nut 34 could be omitted of course and the main buffer spring relied upon entirely. 41 indicates the usual tabulator stops mounted upon the stop bar 23. The upper ends of the plungers 3 are reduced at 42, (Figs. 2, 5 and 18), and bored through as at 43. 45 indicates triggers, having projections 46 extending from them. The triggers are slotted at 47 and bored through at 48 so that a reduced portion 42 of one of the plungers 3 may be slipped into the slot 47 and a pin 49 (Fig. 2), passed through the holes 43 and 48, whereby the trigger is pivotally connected to the plunger 3. The free ends of the triggers are reduced as at 50 to a thickness equal to about one-half of a letter space, beveled at 49. The reduced portion is of the same thickness as the projections 46. 51 indicates what I shall call the trap rack, which is provided with teeth 52 about one-half a letter space in width and which leaves spaces between the teeth of about the same width. Along one edge of the trap rack is a shelf 53 which serves as a limit stop for the triggers when they are in their positions as seen in Fig. 3, and along the opposite edge rises a ledge 54. Between the ledge and the teeth, plugs 55 are adapted to be thrust, (Fig. 7), the plugs being of about the same width as the spaces between the teeth 52. 56 is a plate which is removably attached to the trap rack as by screws inserted into holes 57 through each end of the plate and the trap rack. The trap rack is rigidly secured by screws 58 to a bracket 58—a which in turn is rigidly secured by screws 58—b to the movable frame 17—a. 59—a is a bracket secured by screws 59—b to the movable frame 17—a, bent over into the form as shown in Fig. 10, and bored through as indicated in dotted lines at 60—a to receive a screw 60—b on which is a nut 60—c which rigidly holds a dash pot 60—d. Upon one end of the stop rod 23 is mounted a pair of plates 60—e, between which is confined a cup leather 60—f, the plates and the cup leather being secured by a screw 70—a to one end of the stop bar 23. 59 is the usual feed pinion, (Fig. 6), pivoted at 60 to a bracket 61, secured to the printing carriage by screws 62, and whose teeth 63 co-act with a pawl 64 in a well known manner. The relative position of the pawl and the teeth are shown in dotted outline as they appear when the printing carriage has been arrested by the tabulator stops, and at the time when the trigger 45 is in registry with one of the spaces between the teeth 52 of the trap rack, as seen in full lines in Fig. 13. 50—a is a plate having teeth 62, (Fig. 17), spaced apart a distance equal to the thickness of the projection 46 of the triggers 45. The plate is secured to posts 46—b by screws 46—a, and the posts are secured to the plunger box 4 by screws 46—c. 60 is a leaf spring (Fig. 14), whose inner edge is secured to the plate 50—a, and which is cut into teeth 61, each of which presses upon a trigger 45. As the free end of a trigger 45 moves to its dotted position in Fig. 3 it either passes between two of the teeth 52 of the trap rack 51 or if there be a slight inaccuracy of the spaces between the teeth, the trigger may ride freely over the teeth. During this movement of the trigger its projection 46 passes between a pair of the teeth 62 of the comb 50—a. The result of this arrangement is that a trigger, when operated, does not affect any trigger adjacent to it, and the free ends of the triggers are suppported firmly against any side-wise movement by the teeth 62.

The operation of the device is that when a tabulator key 2 be depressed with a resultant movement of a corresponding plunger 3 from its normal position as seen in Fig. 2 to its position as seen in Fig. 3, the upper end of the plunger being drawn backwardly about the pivot 5, the trigger 45 connected to the operated plunger will move from its position as seen in Fig. 2 to its position as seen in Fig. 3. The operator can now immediately remove pressure from the tabulator key 2, but the trigger can not return to its normal position as seen in Fig. 2 because the usual motor mechanism 19 is constantly acting to draw the printing carriage in letter feed direction as indicated by the arrow in Fig. 13, and when the tabulator key 2 was depressed the trigger took its position as seen in full lines in Fig. 13 exactly at that time; with the result that the printing carriage commenced to move in letter feed direction, causing the beveled end 49 of the trigger to ride up on the tooth next to the space A through which the trigger had just passed backwardly. The beveled end of the trigger of course continued in a ratchet-like action over all the teeth until the tabulator stop 41 collided with the extended plunger 3 at the printing point B, when the trigger took its dotted position, and at which time a tendency of the carriage to rebound occurred, proportionate to the length of the tabulating run of the carriage. No rebound, of course, could actually occur because the relatively sharp beveled edge of the trigger could not ride out of the space indicated at B in a direction opposite to the pointing arrow; it being kept in mind that the trap rack is not capable of any lateral movement whatever. The action just described is exactly what occurred when no buffer spring was employed. Now if a buffer spring 27 had been employed the trigger 45 would have behaved in exactly the same manner as described until it reached the printing point B, at which, however, it could not stop because the tabulator stop 41 which had just been struck by the extended plunger 3 offered no positive resistance to the movement of the carriage in the direction of the arrow, but yielded instead due to the action of the buffer springs 36 and 27, which of course allowed the carriage to pass beyond the printing point B, in the direction of the arrow to the dot and dash position of the trigger, for example, owing to the length of the tabulator run. The carriage of course could not then return to the printing point under the reflex action of the buffer springs for the same reason that prevented rebound when no buffer was employed, and as just explained. However if plugs 55 had been inserted between the printing point B and the dot and dash position of the trigger, then the carriage would have, of course, been instantly returned to the printing point B by the reflex action of the buffer springs and would have been positively prevented from passing that point, due to the beveled end of the trigger snapping into the space B, or, in other words, preventing any rebound whatever away from the printing point. The printing point was of course determined in the first place by removing the plug 55 from its position at the printing point B, and all the other plugs preceding that point allowed to remain in place so that there would be no ratchet action or noise at all as the printing carriage moved towards the printing point, as is obvious. The only reason I recommend the equipment of the trap rack with the plugs, plate 56 etc., is that it may be found desirable in demonstrating the apparatus to a customer, where it is necessary to quickly set the tabulator stops 41 to suit a particular "set up", or printed form of the customer, which can be done quickly, and removing the plugs 55 wherever the printing points occur in the printed form. In stock machines there is, of course, no necessity for the plugs, plate and so on. All that is necessary is to provide the trap rack with as many notches as there are printing points, having first ascertained from the customer where he desires the printing points to occur to suit his printed forms.

I have illustrated my invention in its application to a flat bed writing machine; but it will, of course, be understood that the device can be successfully applied to other forms, including typewriters having cylindrical platens, and wherein the tabulator plungers are mounted upon the fixed or immovable frame of the typewriter and the stop rod mounted upon the carriage which moves upon such frame, as, for example, in the well known Remington, Underwood, Smith and like machines. In case the application of the invention to such as the last mentioned machines be not entirely obvious to the reader, I have clearly illustrated it in Fig. 15.

Figure 15:
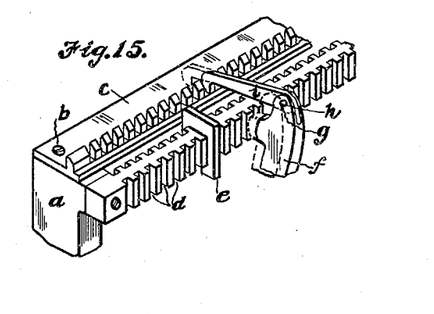
Fig. 15 is a similar view showing the manner of attaching the device to a typewriter having a cylindrical platen instead of a flat platen.
Figure 16:
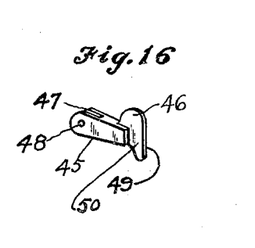
Fig. 16 is a perspective view of one of the triggers.

In that Figure reference numeral $a$ indicates the carriage to which is rigidly secured as by screws $b$, the trap rack $c$. $d$ is the tabulator stop rod, $e$ the tabulator stop, $f$ the tabulator plunger pivotally mounted upon the fixed frame of the typewriter in the usual manner, and which is adapted to be moved into the path of the tabulator stop $e$, as seen in dotted lines, during a tabulating operation so as to arrest the carriage at the writing point. In this case the plunger $f$ is bored through as at $g$ to receive a pivot pin $h$, upon which is mounted a trigger $i$, which co-acts with the trap rack in exactly the same manner as has been already fully described, with exactly the same resultant arrest of the carriage at the writing point, with no possible rebound, etc. In applying the device to machines having cylindrical platens a buffer spring may obviously be employed if desired, as already fully explained. The trigger of course automatically acts to allow the typewriter carriage to move freely throughout the entire tabulating run of the carriage for the same reason as already explained in connection with operation of the parts when the device is applied to the Elliott Fisher, or flat bed machine.

The rebound preventing trap may or may not lock out the tabulator according to the will or caprice of the operator, nevertheless the invention would be operative and a step forward in the art even if the tabulator were not locked out at all because all the teeth 52 on the trap rack could be removed except a pair of them, the space between which represents the printing point, in which case, of course, the operator would be compelled to hold the tabulator key depressed until just before the impact of the tabulator plunger and the tabulator stop on the stop rod, at which time pressure could be removed with absolute certainty that the carriage would not rebound at all, in case no buffer spring were employed; and if a buffer spring were employed, one or two more of the plugs 55 could be left in place on the trap rack immediately to the right of the printing point as viewed by the operator so that during the movement of the carriage past the printing point against the buffer spring and its return thereto the rebound mechanism could not unlock itself except at the printing point, beyond which the carriage could not pass in such return movement because the sharp edge of the beveled end 49 of the trigger 45 would instantly descend into the space B, (Fig. 13), and stop this return movement or rebound of the carriage beyond the printing point B, exactly in the same manner as when all the plugs except those at the printing points were in place.

What is claimed as new is:

1. A typewriting machine having a frame, a carriage movable thereon, tabulating mechanism, rebound preventing means, means whereby said rebound preventing means is automatically set for control of carriage tabulating movement in the initial operation of the tabulating mechanism, said rebound preventing means finally interrupting the carriage movement at the predetermined writing point determined by the tabulating mechanism.

2. A typewriting machine including a frame, a carriage movable thereon and tabulating mechanism, rebound preventing means, and connections between the tabulating mechanism and rebound preventing means, said connections setting the rebound preventing means for complete control of the carriage tabulating movement following initial operation of the tabulating mechanism, said rebound mechanism automatically maintaining control of the carriage movement during a complete tabulating movement thereof and interrupting said carriage movement at the writing point determined by the tabulating mechanism.

3. A typewriting machine including a frame, a carriage movable thereon and tabulating mechanism, rebound controlling means and connections between the rebound controlling means and tabulating mechanism, said connections operating in the inauguration of the tabulating mechanism to set the rebound controlling means for maintaining complete control of carriage tabulating movement during the tabulating run, said rebound controlling means automatically releasing control of carriage movement and simultaneously locking the carriage momentarily against movement when the carriage comes to rest at the predetermined writing point.

4. A typewriting machine having a frame, a carriage movable thereon and tabulating mechanism, rebound controlling means and connections between said controlling means and tabulating mechanism to automatically set the rebound controlling means in the inauguration of the tabulating mechanism for complete control of the carriage movement during the tabulating run, the control of the carriage tabulating movement by the rebound controlling means being automatically maintained until the carriage reaches the writing point in a rebound action, said rebound locking means then releasing control of carriage movement and momentarily holding the carriage in a state of rest at such writing point.

5. A typewriting machine having a frame, a carriage movable thereon and tabulating mechanism, rebound controlling means and mechanism serving in the initial operation of the tabulating mechanism to set the rebound controlling means for complete automatic control of carriage movement during the tabulating run, said rebound controlling means maintaining control of carriage movement following conclusion of the tabulating run and releasing such control when the carriage comes to rest at the predetermined writing point.

6. A typewriting machine having a frame, a carriage movable thereon and tabulating mechanism, rebound controlling means and mechanism serving in the initial operation of the tabulating mechanism to set the rebound controlling means for complete automatic control of carriage movement during the tabulating run, said rebound controlling means maintaining control of carriage movement following conclusion of the tabulating run and releasing such control when the carriage comes to rest at the predetermined writing point, said rebound controlling means temporarily locking the carriage during such control release.

7. A typewriting machine including a frame, a carriage movable thereon, a carriage buffer means and tabulating mechanism, rebound controlling means, and connections between the rebound controlling means and the tabulating mechanism, said connections serving to automatically set the rebound controlling means for complete independent control of carriage movement during the tabulating run and to maintain said control during carriage movement responsive to the buffer action, said controlling means interlocking the carriage temporarily against movement when the carriage reaches a predetermined writing point on rebound movement.

8. A typewriting machine including a frame, a carriage movable thereon, carriage buffer means and tabulating mechanism, rebound controlling means, and connections between the rebound controlling means and the tabulating mechanism, said connections serving to automatically set the rebound controlling means for complete independent control of carriage movement during the tabulating run and to maintain said control during carriage movement responsive to the buffer action, said control means interlocking the carriage temporarily against movement when the carriage reaches a predetermined writing point on rebound movement, said rebound controlling means in that movement necessary to temporarily lock the carriage at the writing point serving to release control of carriage movement.

9. The combination with a typewriting machine including a frame, a carriage movable thereon and tabulating stops, of rebound controlling means and connections between said rebound controlling means and one of the tabulatig stops to automatically set the rebound controlling means in the actuation of that stop, said rebound controlling means when set automatically maintaining independent control of carriage movement during the tabulating run and to continue such control following interruption of carriage movement by the tabulating stops and until the carriage is arrested at the predetermined writing point.

10. The combination with a typewriting machine having a frame, a carriage movable thereon, a cariage buffer and tabulating mechanism, of rebound controlling means and connections between said controlling means and tabulating mechanism to automatically set the rebound controlling means in the inauguration of the tabulating mechanism, said rebound controlling means when set automatically maintaining independent and complete control of carriage movement during the tabulating run and maintain such control until the tabulating mechanism becomes ineffective for carriage movement interruption.

11. The combination with a typewriting machine having a frame, a carriage movable thereon and tabulating mechanism, of a combined tabulator lock-in and rebound controlling device, said device including a carriage-carried part and a frame-carried part adapted to coactively cooperate with each other in the initial manual operation of the tabulating mechanism to thereafter maintain complete control of carriage movement before the carriage reaches the printing point in a tabulating operation.

12. The combination with a typewriting machine having a frame, a carriage movable thereon and tabulating mechanism, of a combined tabulator lock-in and rebound controlling device, said device including a carriage-carried part and a frame-carried part adapted to coactively cooperate with each other in the initial manual operation of the tabulating mechanism to automatically maintain thereafter complete control of carriage movement before the carriage reaches the printing point in a tabulating operation, said carriage-carried part momentarily interlocking with the frame-carried part to prevent rebound of the carriage past the predetermined printing point and simultaneously releasing control of carriage movement.

13. The combination with a typewriting machine having a frame, a carriage movable thereon and tabulating mechanism, of a combined tabulator lock-in and rebound controlling device, said device including a carriage-carried part and a frame-carried part adapted to coactively cooperate with each other in the initial manual operation of the tabulating mechanism to automatically maintain thereafter complete control of carriage movement before the carriage reaches the printing point in a tabulating operation, said carriage-carried part momentarily interlocking with the frame-carried part to interrupt carriage movement at a predetermined writing point, the interlock automatically releasing as the carriage comes to rest.

14. The combination with a typewriting machine having a frame, a carriage movable thereon and tabulating mechanism, of a combined tabulator lock-in and rebound controlling device, said device including a carriage-carried part and a frame-carried part adapted to coactively cooperate with each other in the initial manual operation of the tabulating mechanism to automatically maintain thereafter complete control of carriage movement before the carriage reaches the printing point in a tabulating operation, said carriage-carried part momentarily interlocking with the frame-carried part to interrupt carriage movement at a predetermined writing point, the interlock automatically releasing as the carriage comes to rest, the automatic release of the interlock simultaneously disconnecting the tabulating mechanism control.

15. The combination with a typewriting machine including a frame, a carriage movable thereon, tabulating mechanism, and a carriage buffer, of a combined tabulator lock-in and rebound controlling device including a carriage-carried part and a frame-carried part, said carriage-carried part and frame-carried part being automatically set for cooperation in the initial manual operation of the tabulating mechanism to automatically maintain thereafter control of carriage movement during the tabulating run, said carriage-carried part and frame-carried part interlocking to prevent rebound of the carriage past the writing point under buffer action, said interlocking being automatically released as the carriage comes to rest at the predetermined writing point.

16. The combination with a typewriting machine including a frame, a carriage movable thereon, tabulating mechanism, and a carriage buffer, of a combined tabulator lock-in and rebound controlling device including a carriage-carried part and a frame-carried part, said carriage-carried part and frame-carried part being automatically set for co-operation in the initial manual operation of the tabulating mechanism to automatically maintain thereafter control of carriage movement during the tabulating run, said carriage-carried part and frame-carried part interlocking to prevent rebound of the carriage past the writing point under buffer action, said interlocking being automatically released as the carriage comes to rest at the predetermined writing point, the automatic release of the interlock interrupting the tabulating control of carriage movement.

17. The combination with a typewriter including a frame, a carriage movable thereon, tabulating mechanism and a carriage buffer, of a combined tabulator lock-in and rebound controlling device including a carriage-carried part and a frame-carried part, said parts cooperating in the initial manual operation of the tabulating mechanism to automatically maintain thereafter control of carriage movement during the tabulating run and during carriage movement responsive to buffer action, said parts releasing the carriage movement control and interlocking the carriage and frame at a predetermined writing point following buffer influence to maintain the carriage in a position of rest at such writing point, said interlocking of said parts being automatically released and the tabulating control of carriage movement interrupted immediately succeeding said interlock.

18. The combination with a typewriting machine comprising a frame, a carriage movable thereon, and tabulating mechanism, of a single lock, and connections between the same and the tabulating mechanism to lock the tabulating mechanism in operative position during a tabulating operation, said lock preventing rebound movement of the carriage.

19. The combination with a typewriting machine comprising a frame, a carriage movable thereon, and tabulating mechanism, of a single lock having one of its parts mounted upon the carriage and the other part mounted upon the frame, connections between the lock and the tabulating mechanism to lock the tabulating mechanism in operative position during tabulating operation, the lock preventing rebound movement of the carriage.

20. The combination with a typewriting machine comprising a frame, a carriage movable thereon, tabulating mechanism and a carriage buffer, of a single lock having one part mounted upon the carriage and another part mounted upon the frame, connections between the lock and the tabulating mechanism to lock the tabulating mechanism in operative position during a tabulating operation, the lock preventing rebound movement of the carriage, said lock remaining continuously effective during the complete tabulating run of the carriage.

21. The combination with a typewriting machine comprising a frame and a carriage movable thereon, of tabulating mechanism including a carriage buffer, and means operated in the initial manual operation of the tabulating mechanism to completely control carriage movement during the entire tabulating run of the carriage including that incident to buffer action.

22. The combination with a typewriting machine including a frame, a carriage movable thereon and tabulating mechanism, of means mounted partly on the carriage and partly on the frame, said means being rendered operative by an initial manual actuation of the tabulating mechanism for completely controlling carriage movement during the full tabulating run of the carriage.

23. The combination with a typewriting machine comprising a frame, a carriage movable thereon, tabulating mechanism and a carriage buffer, of means operated in an initial manual actuation of the tabulating mechanism to completely control carriage movement during the full run of the carriage incident to tabulating and buffer movement.

24. The combination with a typewriting machine comprising a frame, a carriage movable thereon, tabulating mechanism and a carriage buffer, of automatic rebound controlling mechanism, a part of which is mounted upon the frame and a part upon the carriage the said parts actively interlocking before the carriage reaches the printing point and maintaining said interlock regardless of the movement of the carriage beyond that point against the buffer.

25. The combination with a typewriting machine comprising a frame, a carriage movable thereon, tabulating mechanism and a carriage buffer, of a combined tabulator lock-in and rebound controlling device, connections between the device and the tabulating mechanism to lock in the tabulator before the carriage reaches the printing point and prevent carriage rebound, and means finally unlocking the device without manual manipulation.

26. The combination with a typewriting machine comprising a frame, a carriage movable thereon, tabulating mechanism, and a carriage buffer, of a combined tabulator lock-in and rebound controlling device, connections between the device and the tabulating mechanism to lock in the tabulator during the full tabulating movement of the carriage and prevent rebound, and means to automatically unlock the device without further manipulation of any of the parts.

27. In a typewriter including a frame, a carriage movable thereon, tabulating mechanism, and rebound controlling mechanism to compel the completion of a tabulating run of the carriage and the final arrest of the carriage at the printing point without manual assistance after the tabulating run has once been initiated.

28. In a typewriter including a frame, a carriage movable thereon, tabulating mechanism, a carriage buffer, and carriage rebound controlling mechanism to compel the completion of a tabulating run of the carriage including that responsive to buffer action and the final arrest of the carriage at the printing point without manual assistance after the tabulating run has been manually initiated.

In testimony whereof I affix my signature.

FREDERICK P. GORIN.